US012088023B2

(12) United States Patent
Cromarty et al.

(10) Patent No.: US 12,088,023 B2
(45) Date of Patent: Sep. 10, 2024

(54) RADIO-RELATED TELECOMMUNICATIONS SYSTEMS AND METHODS

(71) Applicant: Heathkit Company, Inc., Santa Cruz, CA (US)

(72) Inventors: Andrew Scott Cromarty, Palo Alto, CA (US); Jacob H. Neugass, Santa Cruz, CA (US); Jasen Levoy, Santa Cruz, CA (US); William Charles Calhoun, North Bend, WA (US)

(73) Assignee: Heathkit Company, Inc., Ottsville, PA (US)

( * ) Notice: Subject to any disclaimer, the term of this patent is extended or adjusted under 35 U.S.C. 154(b) by 158 days.

(21) Appl. No.: 17/961,992

(22) Filed: Oct. 7, 2022

(65) Prior Publication Data

US 2023/0028456 A1 Jan. 26, 2023

Related U.S. Application Data

(62) Division of application No. 15/221,279, filed on Jul. 27, 2016, now Pat. No. 11,469,505.

(60) Provisional application No. 62/198,004, filed on Jul. 28, 2015.

(51) Int. Cl.
*H01Q 7/00* (2006.01)
*H01Q 1/00* (2006.01)
*H01Q 1/22* (2006.01)
*H01Q 1/36* (2006.01)

(52) U.S. Cl.
CPC ............... *H01Q 7/00* (2013.01); *H01Q 1/007* (2013.01); *H01Q 1/22* (2013.01); *H01Q 1/36* (2013.01)

(58) Field of Classification Search
CPC ............ H01Q 7/00; H01Q 1/007; H01Q 1/22; H01Q 1/36
See application file for complete search history.

(56) References Cited

U.S. PATENT DOCUMENTS 3,396,348 A 8/1968 Wang
3,487,414 A 12/1969 Booker
4,167,011 A 9/1979 Altmayer
6,198,449 B1 3/2001 Muhlhauser et al.
6,518,934 B1 2/2003 Knowles et al.
9,570,798 B1 * 2/2017 Johnson .................. H01Q 1/42
(Continued)

FOREIGN PATENT DOCUMENTS

CN 20394213 U 11/2014

*Primary Examiner* — Ankur Jain
(74) *Attorney, Agent, or Firm* — ISQUIRE PATTON BOGGS (US) LLP

(57) ABSTRACT

This invention discloses two novel antenna assemblies that protect a radio antenna from the elements and permit effective stealthy use with very high performance, and corresponding manufacturing methods. It also discloses a novel assembly for reducing or eliminating radio-frequency interference among electronic equipment such as may be attached to an antenna system, and corresponding manufacturing methods, and systems and methods for model-based radiotelecommunications comprising computing control and command data from one or more multivariate models to operatively control the transmission or reception performance of radioelectronics and antenna systems by computing over the model data to achieve the best performance according to one or more transmission characteristics or user goals.

29 Claims, 3 Drawing Sheets

(56) References Cited

U.S. PATENT DOCUMENTS

| | | | | |
|---|---|---|---|---|
| 9,608,336 | B1 * | 3/2017 | Fong | H01Q 21/30 |
| 2003/0153281 | A1 * | 8/2003 | Abbasi | H04M 1/0202 455/575.1 |
| 2004/0263409 | A1 * | 12/2004 | Hart | H01Q 9/16 343/793 |
| 2006/0212096 | A1 * | 9/2006 | Stevenson | A61B 90/90 607/60 |
| 2012/0119968 | A1 * | 5/2012 | Fong | H01Q 9/30 343/825 |
| 2016/0248144 | A1 * | 8/2016 | Stauffer | H01Q 1/1242 |

* cited by examiner

RADIO-RELATED TELECOMMUNICATIONS SYSTEMS AND METHODS

PRIORITY CLAIM

This application is a divisional application of U.S. patent application Ser. No. 15/221,279, filed Jul. 27, 2016, which claims the benefit of U.S. Provisional Application No. 62/198,004, filed on Jul. 28, 2015. All of the foregoing applications are hereby incorporated by reference in their entireties.

FIELD OF INVENTION

The present invention generally relates to the field of antennas and electronic systems for transmitting or receiving radio signals and equipment that attaches to them. By "radio" it is meant any transmitted or received signal using electromagnetic radiation, whether its purpose is radio communications, television, data or any other communication purpose.

BACKGROUND

An antenna that is larger (e.g. longer), mounted externally to a building, and high up on or near its roofline generally has better transmission and reception characteristics than the same antenna mounted inside the building or on a lower floor, where reception may be occluded by natural objects or structures and where and man-made noise sources are closer. However, an antenna is part of an electrical circuit and therefore the exposure of the components to the weather elements will cause the circuit to deteriorate and thereby require the antenna's replacement. Where an antenna of conventional appearance and structure is mounted high up on a house or building, this may be deemed unsightly or be forbidden by homeowner association (HOA) rules or restrictive property Conditions, Covenants, and Restrictions (CC & Rs). In addition, some HOAs require antennas and other structures to be aesthetically pleasing or have minimal visual impact, for example, requiring that any building attachments must blend into the facade of the home or otherwise be obscured.

Gain is one important measure of antenna performance. Gain over a standard theoretical isotropic antenna, commonly measured in decibels isotropic (dBi), is a desirable antenna characteristic. Stealth suggests employing a shorter, thus less visible, antenna. However, antenna gain is compromised significantly and materially when an antenna is shortened relative to its wavelength for the desired frequency of operation. A sufficiently short, coiled, or compressed antenna becomes "deaf" to many signals the user may wish to receive, and also is unsuitable for effective efficient transmissions, especially at moderate to high power. For example, transmitting into a too-short antenna can damage modern transmitting equipment. Techniques commonly employed to attempt to permit such transmission necessarily compromise radiation efficiency, result in signal energy loss in transmitting equipment, require additional expenditures for equipment and materials, and most often require reduced transmission power. In general, shortening an antenna is an undesirable and ineffective compromise and does not serve the antenna user's communications needs well.

Radials may be required in certain antenna designs. A radial, or counterpoise, is generally an additional conductor that effectively electrically replaces part of an antenna of shortened or compromised design. For example, a half-wavelength dipole antenna can be shortened to half its length to achieve a quarter-wavelength dipole, but its efficiency, standing wave ratio (SWR), and other characteristics will be materially compromised, and to restore a fraction of the half-wavelength dipole antenna's effectiveness, a large number of radial wires or elements must be attached at its base feedpoint.

On most commonly-used roof-mounted vertically-polarized quarter-wavelength antennas, for example, radial elements comprising metal rods protrude visibly in all directions from the antenna base. These protruding metal rods mark the antenna system unambiguously as an antenna structure to any passerby, even from a long distance, and they decrease its stealth and unobtrusiveness. An alternative approach to improving a shortened antenna is to attach a capacitive "top-hat" or metal array protruding from the top of the antenna. Such top-hat designs are equally unsightly and fail to achieve stealth and unobtrusiveness objectives of consumers in today's markets.

Generally an antenna pattern mathematically represents the strength of its reception, or equivalently its transmission, in three-dimensional space. In some locales, such as certain rural or "fringe" suburban areas or along a natural border such as an ocean, most stations of interest are generally in one or a few compass directions. However, more often signals or stations are available in many directions. An omnidirectional antenna design has theoretically equivalent reception and transmission equally in all compass directions. Effective or apparent gain of an antenna may be achieved either by limiting its reception and transmission pattern, or by having a more effective radiator, such as one that is longer. Limiting the pattern of an antenna to achieve gain is a compromise that either limits its operating direction or else necessitates a method and apparatus to direct or "steer" it to desired signals. In a possibly ideal case, the physical antenna is effectively omnidirectional by design but can be selectively steered or otherwise limited to provide differential gain in the direction of preferred signals or stations.

Generally a trap is a device inserted into an antenna's radiating element to permit certain frequencies to pass while stopping other frequencies. A trap typically induces losses and efficiency, but it has the beneficial effect of permitting the antenna to be seen by the attached transmission line and electronics as having multiple resonant frequencies. A trap is particularly effective where multiple operating frequencies desired for the antenna are not, or are adversely, mathematically harmonically related to each other.

Radio-frequency (RF) current preferentially flows along the surface of a conductor, rather than uniformly through its cross-section. This phenomenon is termed "skin effect." The RF skin effect presents the risk that undesired current flow can occur differentially down the outside of what is intended to be an unbalanced conductor having a ground-potential exterior, such as a coaxial cable feedline or transmission line. "Choke" circuits are filtering circuits that reduce or stop such undesired common-mode currents when properly employed. Choke circuits may be constructed either by creating an inductive structure such as a coil from the unbalanced conductor itself or by introducing toroidal cores or beads to stop current flow in mathematically predictable places along the conductor.

Undesired current also may flow in the attached electronic equipment even where in theory that equipment is at "ground" (neutral) potential. This problem can be exacerbated by improper flow of current from a transmitting antenna back down its exterior coaxial cable braid from the antenna, and also occurs when there is a difference in electromotive force potential between different pieces of electronic equipment. A solution to the former problem is to use a choke at the antenna. A solution to the latter problem is to tie the equipment together using a large-cross-section conductive wire. Conventionally, equipment is tied using wire braid at its chassis ground potential to another piece of braid or a large solid-copper bus bar or solid copper plate, i.e. a dense copper slab. In fact this practice reflects a common error in technical understanding, in that the heavy highly expensive copper plate or bar is unneeded to eliminate RF energy, since due to skin effect the electrons only flow on the exterior surface of the copper yet the user has paid for solid copper, most of which expense was entirely wasted. In addition, when as conventionally occurs loose metallic braid is used as either the bus or attachments to the bus, it is unsightly, non-rigid, and exposed for potential contact with other non-ground conductors or even with a human who is accidentally in contact with a current source at non-ground potential. The high cost of solid copper also discourages purchase and use of suitable bus structures, reducing safety. Attachment to a solid copper bar or plate also is difficult, requiring drilling or other machining of the heavy copper to permit each piece of equipment to be attached. Once such a piece of heavy solid copper has been machined and installed, such as bolted to a wall as commonly occurs, it typically is quite difficult to remove from its installation, making attachment of new or physically different equipment with new attachment requirements costly or unlikely, despite the performance and safety advantages. This limitation also applies to bracket-like solid copper bar mounts bolted to a surface. It also is not unknown for a braid-based bus to slip down a wall behind a desk, for example, and short against the exposed pins of an electrical equipment plug that is not thoroughly pushed into its socket, creating a fire hazard or electrical shock danger. Similarly for consumer entertainment equipment, RF noise due to electromotive force differentials can become a significant impediment to proper operation, even where no antenna or no outside antenna is attached or in use. Very close attachment of equipment to the common-voltage (RF "ground") bus is necessary for proper elimination of RF interference and electrical noise, but this necessarily places the heavy braid or bar grounding device right where it is highly visible and appears unsightly and where accidental electrical contact is most likely. Corrosion is an additional problem in such systems, as copper and other preferred conductors tarnish over time in use, increasingly becoming unsightly and losing electrical connection effectiveness. There thus is a need for a cost-effective highly-conductive RF conduit or bus system for connection at common or ground potential among electronics devices, including those attached to antenna systems and their attached transmission lines, for eliminating environmental and in-building on-equipment RF noise potentials between equipment. The need is for an RF bus that is structurally sound, affordable rather than highly expensive, highly conductive at radio frequencies, cosmetically acceptable at the radio or electronic equipment operating position, and predesigned and machined to accept multiple pieces of attached equipment without losing effectiveness due to corrosion or tarnish over a period of years of operation.

Highly functional but cosmetically acceptable antenna structures also remain a persistent and growing need. For example, the Ventenna™ commercial product was an attempt at a stealth antenna that typifies the compromises of modern antenna system designs for low-power very high frequency (VHF) transmission and reception. It is in essence a short fat pipe wrapped tightly with a coil of narrow-gauge wire and designed to be positioned to cover a low bathroom-plumbing vent pipe of the sort that commonly may protrude several inches through a residential roof. An antenna comprising a tightly wrapped wire coil is well-known in the art to exhibit undesirably high inductive reactance and exceedingly poor radiation efficiency, thus exhibiting low gain for both transmission and reception compared to a standard reference antenna or an antenna that occupies more space and offers a larger aperture relative to a wavelength. Because it achieves its low profile by covering closely over an existing low roof structure such as a short residential toilet stack vent, such an antenna unavoidably has undesirable capacitive reactive coupling to the vent pipe and other roof structures, which often are metallic and may even be grounded. Further, by virtue of being designed as a coiled-wire cover for a low short vent pipe that itself typically is not near the highest point of a roof, such an antenna generally is situated close to internal building radio-frequency noise sources such as poorly-constructed converter power brick adapters, computers, home appliances, poorly-designed lighting systems, and Wi-Fi network access points. It further is not designed or produced in suitable colors and appearances that match the range of any specific consumer's individual building structures so as maximize the opportunity to achieve stealth effectively. These design characteristics result in a class of antenna systems that exhibit seriously compromised performance, failing to adequately resolve the growing problem of market need for a stealthy antenna with acceptable performance.

The performance of "indoor" antennas is known to be quite poor. First, as they are by design placed indoors, they are within a few feet of all the interference-generating electronics of the typical home or workplace, which serve as de facto jamming devices for reception, often creating a measurable noise floor for reception in the tens of decibels or higher and significantly debilitating reception. They also are installed within physical building enclosures that themselves often are radio-opaque, occluding signal transmission in often unpredictable ways. Second, when placed indoors they are not mounted at the building's highest and most advantageous positions, which substantially always are outdoors and atop the structure. Third, in order to fit residential or office decor and be unobtrusive, they must be physically small and thus present a correspondingly small and ineffective aperture for electromagnetic waves. Fourth, to suit the physical limitations of an indoor environment they typically cannot be designed to be resonant and provide an uncompromised length for electromagnetic radiation. (Certain such indoor antenna products are advertised routinely as resonant or "efficient" on an extremely wide range of frequencies, but inspection and analysis using the laws of physics shows such sales and marketing claims to be unjustified by any underlying supporting broadband electrical or physical design.) Although such indoor antennas sometimes are equipped with reception amplifiers, this often exacerbates their performance problems, by making interference from nearby device sources in the building appear even more strongly at the receiver input and by causing the antenna to receive undesired conflicting multipath interference signals even more effectively. In short, the better they attempt to be, the worse they often are, because they enhance reception of jamming signals and interference at least as well as the signals intended for reception.

Unless an antenna can be placed far away from its attached equipment at an optimal location on the structure, it remains close to all the in-building noise and interference sources. If the antenna is not fully enclosed, insects and moisture may infiltrate and interfere with its performance characteristics. If conversely it is fully enclosed, the antenna may experience internal condensation whenever the ambient weather conditions are colder than those at which it was manufactured, causing water to form inside the antenna housing that changes its operating characteristics or causes it to fail entirely. If used for transmitting as well as receiving, such an enclosed antenna could additionally induce expensive or even dangerous catastrophic failure of the transmitting equipment to which it is attached, for example by presenting an unacceptably low impedance load or even a short-circuit to the transmitter under certain weather conditions.

Magnetic loop antennas are typified by H-field vs. E-field electromagnetic radiation. Magnetic loop antennas are typically quiet, that is low-noise in design, but are highly directional and very narrow-banded, requiring constant adjustment when a new frequency or direction of operation is desired. Most often, frequency adjustment is achieved by adjusting a tuning capacitor at the base of the loop, and directional adjustment is achieved by rotating the antenna on a short stand or pole by hand. Although it is known that magnetic loop antennas require installation at some height above ground for safety due to the hazards of the near-field magnetic field they generate when used for transmission, they are rarely installed at height in practice; instead, typical designs and installations are a compromise, installed to operate close to the ground in order to permit the user to perform the constant frequency and direction adjustments their use requires in practice, and further for these reasons they must be, and are routinely, limited to operating at extremely low power when used for transmission.

Existing antenna designs thus have failed to optimize effectively over the complex collection of desirable antenna performance characteristics, instead choosing a small subset of them to optimize, while accepting poor performance on the other performance measures. As a result, the available market choices are all unsatisfactory compromise antennas, especially for use in suburban and urban environments, where homeowner association (HOA) or real estate deed Covenants, Conditions, and Restrictions (CC & Rs) apply, and in other cases where stealth or unobtrusiveness are required for an outdoor installation.

Therefore, there is a need for an antenna system that is protected from the weather while being fully functional and at the same time constructed of materials that permit it to be manufactured to one of a plurality of selected colors or appearances in a reliable and long-lasting weather-resistant way such as to blend in, be stealthy, or go unnoticed, while being mountable in the best possible most effective location and achieving high performance in transmission and reception. There correspondingly is a need for manufacturing methods to produce such antenna systems.

Because often only one such antenna may be permitted or mountable in such circumstances and operating environments, it further is desirable that a single such system be capable of operating efficiently and effectively over a wide range of conditions and frequencies. Specifically, in order for one antenna to perform well for a wide range of frequencies and many uses, it is desirable that the antenna be broadbanded in design (for example, have sufficient aperture to work efficiently across a suitably wide range of radio frequencies), match the natural characteristic impedance of its transmission line and the design impedance of attached radio equipment, provide a low Standing Wave Ratio (SWR) at resonance, present as wide as possible a 2:1 SWR bandwidth, be capable of accepting moderate to high input power when used for transmission, have losses that are as low as possible, generally be omnidirectional and preferably have a tunable pattern, and be as long spatially and electrically as is feasible relative to a wavelength at the desired operating frequency consistent with the other design constraints.

Performance of such a system may be further enhanced if characteristics of the antenna system and its corresponding transmission and reception electronics can be adjusted, preferably remotely such as from within the structure or even from a far-distant location, either manually or automatically, to further improve or optimize telecommunications performance measures. There further is a need for a non-radiating mounting section for such antenna systems associated with a suitably effective large-aperture-electric-field or magnetic-field radiating element, to permit the radiating element to be positioned in the clear away from obstructions, to reduce undesired capacitive coupling and detuning of the radiating element due to nearby structures, to present negligible capacitive and inductive reactance change resulting in undesirable feedpoint impedance and SWR changes, and to permit eliminating unsightly counterpoise radials that attract attention and reduce the stealth nature of the antenna system.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

Figure 1:
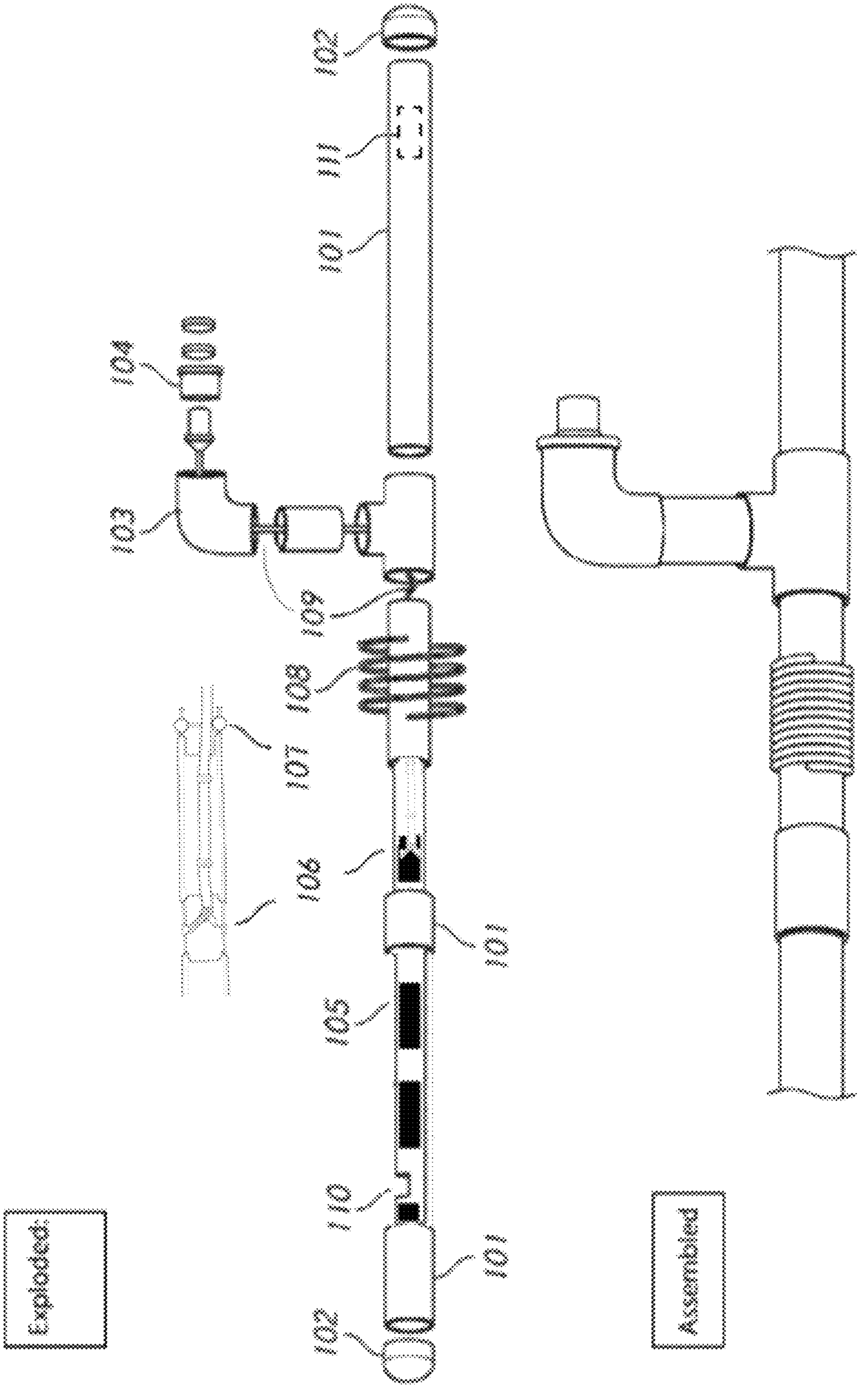
FIG. 1. A drawing of the antenna housing and the antenna circuit, the drawing comprising a figurative break to show the antenna circuit within. There is an exploded diagram and a close-up depiction of the main section assembled.

Remaining figures: pictures of various antenna components.

DETAILED DESCRIPTION

Various examples of the invention will now be described. The following description provides specific details for a thorough understanding and enabling description of these examples. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The invention of an antenna assembly is disclosed, whereby in one embodiment it comprises:

- a housing with a first and second end;
- a radiating element situated within the housing at least between the first and second ends of the housing, the longitudinal axis of the radiating element being substantially parallel to the longitudinal axis of the housing and having a first and second circuit connection;

a terminal assembly, with an interior and exterior, said terminal assembly mounted to the exterior of the housing, said terminal assembly having a first and second conductor that passes from the interior of the terminal assembly to the exterior of the terminal assembly;

a choke circuit with a first and second side, said choke circuit connected on the first side with a first and second lead wire to the first and second circuit connection of the radiating element, respectively and connected on the second side with a third and fourth lead wire to the first and second conductors of the terminal assembly, respectively at the interior side of the terminal assembly; and where said first and second ends of the housing are closed and substantially watertight.

In another embodiment, the choke circuit is an integral choke circuit. In one embodiment, an integral choke circuit may be accomplished by using a single electrically-continuous piece of coaxial cable within the antenna housing to serve as the said conductors of the terminal assembly, the choke, and said conductors connected to the radiating element. A choke may be comprised of turns of coaxial cable, or of a length of coaxial cable surrounding which toroidal cores or beads or equivalent structures known to restrict current flow have been placed to limit coax braid current flow, or a combination thereof.

In another embodiment, the radiating element is a parallel-conductor line, comprised of two parallel conducting wires, each with a first and second end, where the first ends are bridged together and the second ends are bridged together and a gap is situated in one of the first or second parallel conductors so as to form a partial loop of a conductor. In a preferred embodiment the parallel-conductor line is a ladder or window line, for example a 400 to 450 ohm window line comprising 14 or 16 gauge wires. In another embodiment, the parallel conductor of the radiating element contains no window feature except where required to permit connection of the first and second wires and of any wires or conductors that serve as a bridge element such as at the end of the radiating element. In a preferred embodiment, said gap is situated an odd multiple of a quarter wavelength at the desired operating frequency from one end of the radiating element. In a preferred embodiment, the loop conductor length is resonant at the desired lowest frequency of operation. In one embodiment, the first and second wires are attached to the radiating element in the location to achieve a desired SWR or reactance at a specified operating frequency. In a preferred embodiment, the first and second wires are attached to the radiating element in the location that minimizes SWR at the designed lowest resonant frequency of the antenna. In another preferred embodiment, the first and second wires are attached to the radiating element in the location that minimizes SWR at the measured lowest resonant frequency of the antenna.

In another embodiment, the radiating element is a copper pipe or other metal pipe or conductive conduit. Preferably, the copper or metal pipe or conductive conduit has a diameter larger than a conventional wire. In one embodiment it is hollow in cross-section. In a preferred embodiment, the radiating element is multiple lengths or segments of copper pipe.

In a preferred embodiment, said copper pipe segment or segments are manufactured or cut to be a length designed to provide resonance at a desired operating frequency of the antenna assembly. In a preferred embodiment comprising copper pipe as a radiating element, a first and second collinear copper pipe segments are joined together to form a radiating element assembly using a nonconductive connector block situated between the first and second copper pipe segments. In one preferred embodiment, said nonconductive connector block is situated at the midpoint of the first and second conductive segments. In another embodiment, the antenna radiating element comprises more than two collinear conductive segments each separated by a nonconductive connector block. In one embodiment, a coaxial cable feedline passes from one end, inside the first radiating element, and through one of two collinearly placed copper pipes to the nonconductive block assembly where the first and second leads of the cable's conductors are attached, respectively, to the first and second collinear copper pipe segments. In another embodiment, the coaxial cable passes up the inside of the radiating element and in the region of the connector block, which may be hollow, is split into a first and second lead wires that attach to the first and second copper pipe elements respectively. In another embodiment, the first and second lead wires are coupled to the copper pipe or other radiating element or elements using a matching network such as a gamma match. In a preferred embodiment, the combined electrical length of the entire collinear copper assembly is a half-wavelength at the lowest desired operating frequency. In another embodiment, electrical length of each copper element of the collinear copper assembly is any odd multiple of one quarter-wavelength at one or more desired operating frequency or frequencies. In another embodiment, one portion of the collinear assembly is comprised of a solid or hollow material such as copper rod or pipe, and a second portion of the collinear assembly is comprised of a different material such as coaxial cable or a parallel-conductor line, each having a length providing resonance on a desired frequency such as any odd multiple of one quarter-wavelength at one or more desired operating frequency or frequencies. These embodiments may be combined. For example alternative matching networks may be combined with each of these element embodiments. Similarly one or more traps may be positioned along the length of one or more elements of any of the alternative element embodiments.

In another embodiment, the choke circuit is a coil comprised of at least one turn of a coaxial wire, said coaxial wire having a first and second end and being comprised of a core conductor and a shield, where the first side of the choke circuit is the first end of the coaxial wire and the second side of the choke circuit is the second end of the coaxial wire, and the first and second leads are comprised of or connected to the core and shield, respectively, at the first end of the coaxial wire and the third and fourth leads are comprised of or connected to the core and shield, respectively, at the second end of the coaxial wire.

In another embodiment, the first and second conductors respectively comprise the inner and outer conductors of a coaxial cable. In another embodiment, one or more antenna radiating elements comprise coaxial cable.

In a preferred embodiment, the second outer (braid) conductor of the coaxial cable is electrically attached to the side of the parallel conductor of the radiating element having a gap, and the first (inner) conductor of the coaxial cable is attached to the other conductor of said parallel line radiating element having no gap. In an alternative embodiment, both conductors of the coaxial cable are attached to the same single conductor of said parallel radiating element.

In another embodiment, the coil comprising the choke circuit is wound around the exterior of the housing. In a preferred embodiment, the coaxial cable of the choke first passes through the interior of the housing until it reaches the locus of the choke, whereupon it exits through an opening to the exterior of the pipe, is turned around the exterior of the housing to form a radio frequency choke, and reenters the housing through a second opening. Preferably, the openings are situated precisely at the intended ends of the choke coil.

In another embodiment, the coil comprising the choke circuit is wound within the housing.

In one embodiment, said choke may include toroidal or bead inductors such as to enhance its effectiveness. In another embodiment, a choke circuit comprising ferrite cores or beads or other material capable of altering radio frequency signal passage is situated within or outside the housing.

In a preferred embodiment, the coaxial choke circuit comprises helical turns of coax of a number computed to minimize flow of common-mode current along the outer braid of the coaxial cable at the primary intended operating frequencies of the antenna assembly. In another preferred embodiment, the coaxial choke circuit comprises helical turns of coax of a number computed to minimize the reactance of the choke and present a standard (e.g. 50 or 75 Ohm) resistive impedance at the end of the coaxial cable at the primary intended operating frequencies of the antenna assembly. In another embodiment, toroidal or bead inductors are applied around the coaxial cable to provide additional reduction of common-mode current flow on additional or secondary operating frequencies.

In a preferred embodiment, the housing and elbow and all externally visible components of the antenna system are manufactured with application or use of a colorant such as paint or dye that provides a uniform color. In a preferred embodiment, colorant is chosen to match or visually blend in with common environmental structures, features, and objects such as roof shingles, tiles, structures, trees and vegetation, and sky. The colors could be, for example, black, grey, burnt red, mottled grey and black, various shades of green, and various shades of sky blue. In another embodiment, the antenna assembly is manufactured such that colorant is non-uniformly applied so as to maximize ability to blend into environmental structures, features, and objects. In one preferred embodiment, colorant is applied or used during manufacture or assembly to achieve a camouflage coloration, notably employing brown and green, brown and sand-colored, or white and gray colorants in irregular camouflage patterns or to mimic environmental structures.

In another embodiment, the housing components are manufactured or coated with a colorant that is comprised of metallic or other conductive ingredients. In another embodiment, the housing components are manufactured to a predetermined color where the colorant has substantially no appreciable metallic or conductive ingredients.

In another embodiment, metallic (conductive) and nonmetallic (nonconductive) colorants are used differentially or non-uniformly along the length of the housing in order to achieve spatially varying or differential transmissivity of different sections of radiating element or elements within the housing.

In another embodiment, the first and second ends of the housing are closed using a first and second caps that are at least partially inserted into the respective first and second ends of the housing.

In a preferred embodiment, the housing is composed, designed, or manufactured to appear as similar as possible to common building infrastructure components such as pipes, downspouts, or other structural building elements.

In a preferred embodiment, housing elements are chamfered inside and out at each end to achieve high-quality manufacturing finishes and facilitate assembly.

In a preferred embodiment, the holes in the housing through which the coaxial cable passes at the ends of the choke coil assembly are not normal (perpendicular) to the surface of the housing, but rather are machined on an angle so as to reduce sharp edge pressure on the coaxial cable and permit easier threading of the coaxial cable through the housing during assembly.

In one embodiment, the coaxial cable is a solid-core coaxial cable. In another embodiment, the coaxial cable is a stranded-core coaxial cable.

In another embodiment, the housing has attached a physical component that cosmetically resembles additional structure acceptable for placement on a rooftop or building, such as a satellite antenna dish, flag, vent pipe hood, chimney structure, structural beam, light fixture, downspout, gutter trough, eave, meteorological or other equipment component, or building wiring element. In a preferred embodiment, said additional structure also contains a radiating element or a component of the radiating element, such as to beneficially provide an additional or different radiation pattern, additional antenna gain, additional or improved bandwidth, or better impedance matching characteristics.

In another embodiment, the housing is manufactured with colorant in a distressed appearance to resemble a preexisting weathered building or natural structure.

In a preferred embodiment, the ends of the radiating element comprising a parallel conductor have a conductive moveable bridge that may be adjusted to different positions along the length of the radiating element to change the intended resonant frequency or feedpoint impedance of the antenna. Each moveable bridge may comprise a sliding bar with holes through which the parallel conductor's conductor-wires pass, a sliding bar with clips, a sliding bar with thumbscrews, a wire with coiled ends that grip the parallel wire's conductors, a single bar clip in electrical contact with and bridging both wires of the parallel conductor, and equivalent user-adjustable conductive structures.

In another embodiment, the radiating element is adjacent to or surrounded by a conductive sleeve that may be moved and repositioned to tune the resonant frequency, gain, radiation pattern, feedpoint impedance, or SWR of the antenna.

Movement of either the tuning sleeve or the tuning sliders may be manual or under automatic control, such as by a motor controlled by a computer suitably programmed either to move directly to a known (e.g. stored) configuration, or alternatively to seek a proper configuration. In this embodiment the antenna is further comprised of a first and second motor situated at either end of the interior of the housing. Mounted to the motor axle is a mechanical feature, which in one embodiment is a non-conducting disk, with an eccentric bearing. The eccentric bearing is attached using a bearing to a non-conducting arm at one end, and at the other end, a bearing that holds the conductive bridge across the two parallel conducting lines forming the radiating element. The bridge may be housed in two parallel track assemblies along which the bridge may freely slide as its respective motors turn. The motors are preferably a stepping motor. Two control wires run from each motor to a point in the housing where the control wires exit the housing and are then connected remotely to stepping controller module. As the motors are moved, the bridging conductor slides along the parallel conductors thereby changing the shape or effective electrical length of the antenna partial loop. In yet another embodiment, the stepping motors are controlled by stepping controllers placed in the antenna housing. In this embodiment, the controller is further comprised of a wireless data connection in order that a remote computer can wirelessly transmit commands to the stepping controller and thereby control the shape of the antenna. In one embodiment, the radiating element is a hollow conductor such as a copper pipe and the control wires comprise a coaxial cable passing through the interior of the conductor. In another embodiment, a motor acts to slide a conductive sleeve over the radiating element to change its resonant frequency, radiation pattern, or presented impedance.

A proper configuration may be sought by a method such as the following: measuring the resonant frequency, complex feedpoint impedance, or SWR of the antenna, either locally at the antenna or remotely; relaying said measurement data as required to the remote computer; computing an adjustment of the tuning assembly; sending instructions or voltages to the motor at the antenna to cause the tuning assembly to move; re-measuring the resonant frequency, feedpoint impedance, or SWR of the antenna array; and comparing the measured result to determine whether additional adjustment is required or alternatively the antenna array is in a suitable configuration. Such an algorithm also may be abandoned, that is exited, after a given number of attempts or given number of seconds of attempted adjustments, for example to provide an adequate tuning, to minimize wear, or to minimize energy consumption. The signals to tune the antenna may be sent on a separate conductor or set of conductors, such as attached to but distinct from a coaxial cable running from the operating position to the antenna array. In the alternative, the signal may be sent on the same transmission line conductor feeding the antenna array, by modulating the conductor with a DC or low-frequency AC signal at each end of the conductor and filtering and demodulating to extract it at the other end. In an alternative embodiment, a suitable computer may be located at the antenna to perform these computations locally, either under rule-based local control or under remote control.

In another embodiment, the radiating element has along its length one or more trap elements that limit signal flow depending on frequency, with the trap element designed, selected, adjusted, or tuned to limit or eliminate a first frequency but pass a second frequency. In one embodiment, the first frequency is a lower frequency and the second frequency is a higher frequency. In one embodiment, multiple said trap elements are incorporated along the length of the radiating element or elements of the antenna. In another embodiment, one or a plurality of traps in the antenna assembly pass or limit signal energy, i.e. direct energy toward or away, from radiating elements or element segments, such as elements or element segments that achieve different polarization, antenna pattern, gain, SWR, impedance, or resonance at one or more selected frequencies.

In a preferred embodiment, the antenna system comprises no radiating element in a base housing section.

In a preferred embodiment, the antenna system comprises a full-length aperture greater than a quarter-wavelength of the frequency being transmitted through the antenna.

The further invention of an RF common bus assembly is disclosed, comprising:

A conductive bus element, to which one or a plurality of devices may be attached;

One or a plurality of conductive connecting elements;

One or a plurality of hardware elements for connecting said bus to said one or more connecting elements;

Where the bus is machined to accept the one or more connecting elements through attachment using the one or more hardware elements.

In a preferred embodiment, an RF bus, known here as a common bus due to its zero reference voltage, is machined from conductive hollow pipe. In a preferred embodiment the bus is manufactured of copper pipe.

Preferably, the bus is mounted so as to be structurally sound, such as on a wooden or other physically robust nonconductive base.

Preferably, the copper or other bus pipe is machined periodically along its length to accept multiple pieces of attached equipment by means of a suitably machined tooling resulting in one or more relatively flattened attachment points where hardware may be attached.

Preferably the attached hardware is non-corroding hardware such as stainless steel or brass hardware.

In a preferred embodiment, the equipment chassis each are connected to an attachment point on the bus using a conductive connecting element comprising a short assembly of conductive braid. In a preferred embodiment said conductive connecting element braid assembly comprises copper braid.

In a preferred embodiment the conductive connecting element is a braid assembly that is terminated on one or both ends with a soldered or crimped electrical connector such as a ring or spade lug connector.

In a preferred embodiment the spade or lug connectors are attached to the braid assembly using an environmentally safer substance such as silver solder or RoHS solder.

In one embodiment the braid assembly is enclosed in a nonconductive cover material.

In a preferred embodiment the braid assembly is enclosed in a clear or translucent nonconductive cover material.

In a preferred embodiment an identifying label or mark is attached to the braid conductor inside the clear or translucent nonconductive cover material so as to be visible to the user.

In another embodiment an identifying label or mark is attached to the braid conductor outside the nonconductive cover material so as to be visible to the user.

In a preferred embodiment the nonconductive cover is manufactured so as to be applied snugly against the braid conductor.

In one embodiment the solder or other electrical junction of the braid at each lug is covered with a non-conductive cover.

In a preferred embodiment said non-conductive cover comprises heat-shrinkable material.

In a preferred embodiment said non-conductive cover comprises a colored material to identify the corresponding equipment to which it is attached.

In one embodiment, the bus assembly is enclosed in a nonconductive case or box.

In a preferred embodiment, said nonconductive case or box is hinged.

In a preferred embodiment, said nonconductive case or box is made of wood.

In a preferred embodiment, said case or box is painted, dyed, colored, or stained to resemble typical furniture or cabinetry.

In another embodiment, said case or box is painted, dyed, colored, or stained to resemble typical electronics equipment.

In a preferred embodiment, said case or box is attachable or mountable to a common surface found in occupied buildings such as desk surfaces, furniture and walls.

In a preferred embodiment, said case or box has notches located at its base to permit the conductive connector assembly such as a copper braid to pass through the box and make connection to the bus whether the box is open or closed.

In another embodiment, there may be a plurality of bus assemblies, with one bus electrically connected to another.

In one embodiment, the plurality of bus assemblies may be electrically connected using a flexible braid.

In another embodiment, the plurality of bus assemblies may be electrically connected to each other using a rigid conductor of radio frequencies.

In a preferred embodiment, said rigid conductor connecting a plurality of bus assemblies is comprised of copper pipe.

The further invention of an antenna assembly is disclosed, referred to herein as the "Magtenna". The Magtenna has several embodiments:

In one embodiment, the antenna is a remotely electrically adjustable magnetic loop in an unobtrusive or stealth configuration.

In one embodiment, the antenna provides for remote adjustment, comprising a feedline that sends a control signal to the antenna to adjust its best operating frequency, achieving a significant improvement in operating broadbandedness or range without human physical presence at the loop while preserving the quiet operation characteristics of a magnetic loop. Remote adjustment, and also stealthy design by virtue of mimicking or blending in with building structures, allows the Magtenna to be placed on a roof or other location where the near-field radiation is farther from building occupants thereby enhancing safety and permitting higher-power operation with safety and in accordance with applicable regulations on transmissions.

In one embodiment, the antenna comprises a magnetic loop constructed of any diameter conductor, preferably made of a large-diameter material such as copper pipe or coaxial cable shield to achieve broadbanded operation. The antenna loop element may be exposed or alternatively may be contained within a housing designed to protect and obscure it.

In one embodiment, the antenna comprises more than one physical element. For example more than one loop may be employed in the disclosed antenna system. The multiple elements may be contained coaxially or otherwise within the same bounding prism or sphere in a physical configuration resembling, for example, an eggbeater or wire whisk tool, or alternatively collinearly on the same mounting mast or structure.

In one embodiment, the said multiple elements of the antenna may be adjusted via remotely- or automatically-controlled rotation or adjustment of the antenna to achieve desired performance characteristics. Enhanced directionality control allows the user to select a different directional profile, reducing or eliminating directional effects or environmental or man-made noise interference, or achieve selectable directional transmission behavior.

Automated tuning and performance management of the antenna system and transmission and/or reception system may be achieved, for example, by controlling the delivered feedline signal and antenna position, and thus transmission direction, of the antenna by sending a direction-determination or other performance-determining control signal to the antenna array.

In one embodiment, this may be accomplished using an algorithm that selects a pre-determined or computable position such as via table lookup, geolocation, or spherical coordinate computation.

In another embodiment, search, heuristic, and model-based reasoning methods may be applied such as are known in the art in artificial intelligence, such as A*, hill-climbing methods, temporal difference learning methods, forward chaining, backward chaining, or symbolic or qualitative reasoning. In this embodiment, the Magtenna is further comprised of a stepping motor mechanically attached to the moveable elements of the antenna itself. The stepping motor is controlled by a stepping controller module that is in data communication with a computer, either through a data bus, network connection like an Ethernet™ or by wireless network connection such as Bluetooth™ or WiFi™. It will be appreciated that, as with any network disclosed herein or otherwise, such a network may be further internetworked, and multiple interaction media and modalities are possible alone or in combination, for example including text-based, electromechanical/pushbutton/knob, speech, biometric and biofeedback, messaging-based, application programming interface (API) based, optical, presence-based, electrostatic, magnetic, acoustic, and visual. The computer is configured to receive commands from a user that specify a goal, preferably in terms of frequency of transmission or reception, power level and direction. The computer is configured with a program that executes the heuristic or other algorithm that produces the motor controller commands that maximize the predicted antenna performance for the specified goal.

In one embodiment, performance and directionality control information may be determined based on one or more sets or vectors of multivariate models, phenomena and data such as, without limitation, desired transmission direction, antenna characteristics, terrain, communications performance data, historical and predicted propagation data, sunspot and solar data, geomagnetic data, historical and current or estimated frequency use and congestion data, and other factors predictive of the success of desired transmission and reception. Preferably such data may variously comprise historical, current and forecast data, and may be either estimated or measured. It will be understood that other such factors may be incorporated into such a model and algorithm and their weights adjusted in order to achieve the best performance from the antenna system and any corresponding overall transmission and reception system such as with which or as a part of which it may be used. Examples include transmission characteristics such as frequency, transmission mode, antenna polarization, choice of antenna or antennas, choice of feedlines, power source selection and management, choice of output display, and routing of user integration with the system to alternative display and control devices such as personal digital assistant devices or personal computers locally or remotely including via the Internet or wireless transmission, including selection or application of personal user preference.

Directionality control of the antenna system is not limited to a single plane and may be applied in multiple dimensions, such as in azimuth and elevation or the corresponding dimensions of an alternative coordinate system such as polar coordinates. Various mechanical and electrical techniques for transmission and reception directionality control, such as use of mechanical rotators or electrical "steering" of a signal through differential signal introduction at the feedpoint, may be used.

Turning to the first embodiment of the antenna, in FIG. 1, the housing (101) is shown in an exploded diagram with a figurative breaks in the middle in order to show that within the housing (101) is housed the radiating element, in this case an antenna loop circuit (105). Preferably, the radiating conductor (105) is sufficiently stiff that it can lay inside the housing without sagging, and thereby maintains is position along the length of the housing (101) and thereby maximizing its electromagnetic aperture and the corresponding efficiency and broadbandedness of the antenna. In another embodiment, the antenna loop can be fastened to the ends of the housing to maintain its position in the housing. In yet another embodiment, the antenna loop ends are fastened to the end caps of the housing (102). In the preferred embodiment, the terminal assembly is comprised of an elbow (103), which itself is a hollow housing component. The elbow in this embodiment ensures that the terminal assembly has its exterior connection coming up from underneath, so as to be shielded from rain or snow. However, other embodiments may have the terminal assembly beneficially mounted against the housing in other configurations, such as near or at its base, at its center, or at its top. At the end of the elbow (103) is the terminal assembly (104).

In the preferred embodiment, the radiating element is a modified length of ladder line (sometimes known as window line). (105). The ladder line is a plastic or insulator material formed as a strip with two conductor wires running in parallel along each side. The two wire leads from each side of the loop (106) pass from the ladder line to one side of a choke circuit (108). In this case, the choke circuit is a coil formed by several turns of coaxial cable. The coaxial wire at the end of the choke circuit (109) passes through the elbow (103) to the terminal assembly (104). The ladder line is terminated on both ends with a tunable conducting bridge (107) that connects the two conductors on each side of the ladder line. This forms a loop. In addition, a gap (110) is cut into one of the two conductors forming the ladder line (105). These conductors make the ladder line form the partial loop. The partial loop can be tuned to optimize its transmission or reception characteristics by positioning two bridge conductors (107) at either end of the length of ladder line. The specific place where the two bridge conductors (107) cross from one side of the ladder-line to the other determines the effective size of the loop, a dimension that relates to the wavelengths of radio waves and therefore the operating frequency and quality of the reception or transmission of such radio waves. The two ends of the housing (101) are sealed with caps (102) and the terminal assembly (104) is mounted into the elbow to ensure that the housing and its elbow are watertight.

The coaxial wire forming the coil of the choke circuit (108), (109) can be wound around the exterior of the housing. In this embodiment, the two ends of the coaxial wire return to the interior of the housing through two holes. In order to maintain a watertight seal, the entire choke coil circuit can be surrounded with heat-shrink tubing. In yet another embodiment, the coil forming the choke circuit can be wound in a manner so that it fits within the interior of the housing.

Figure 2:
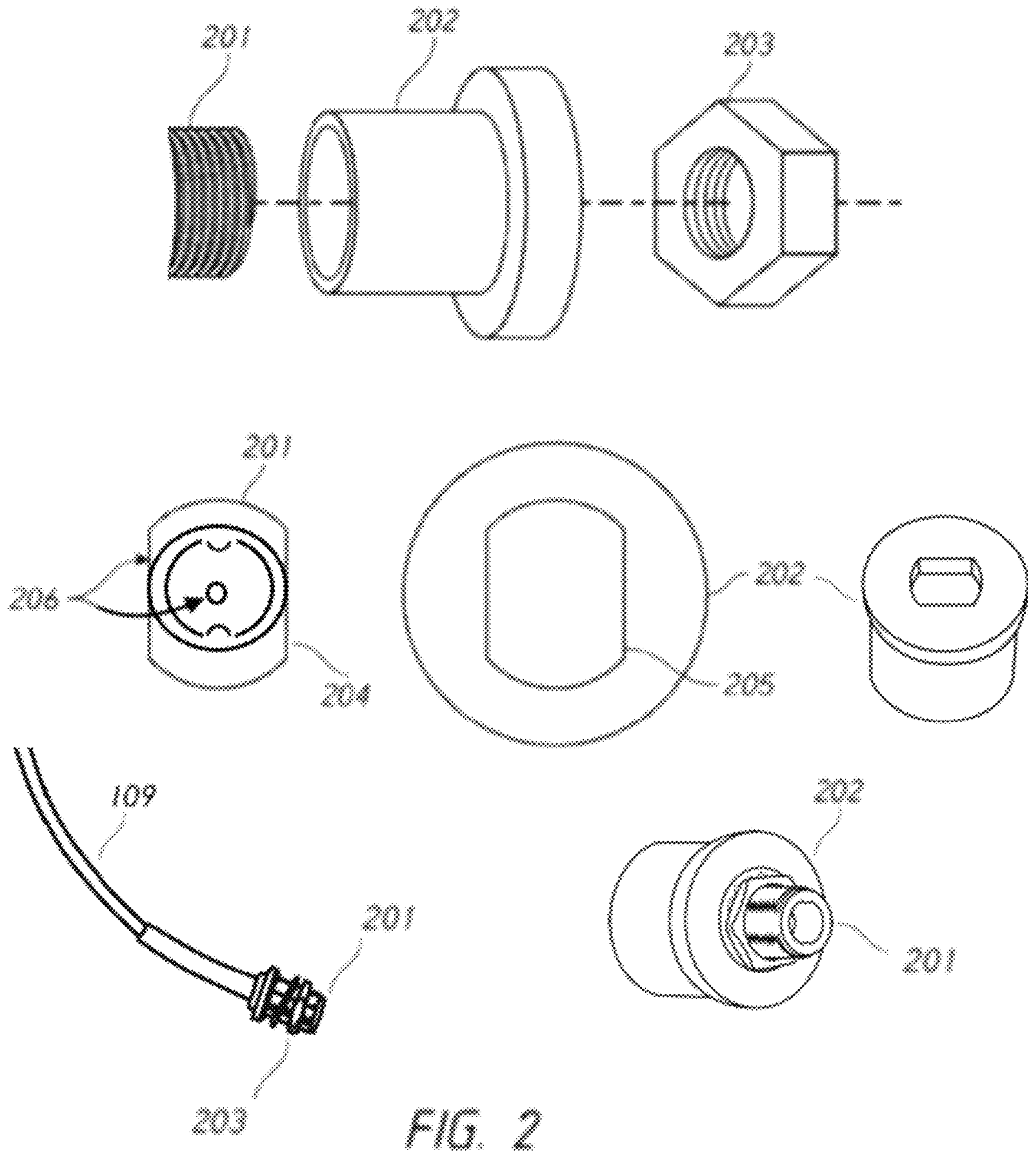
FIG. 2. A drawing of the terminal assembly.
Figure 3:
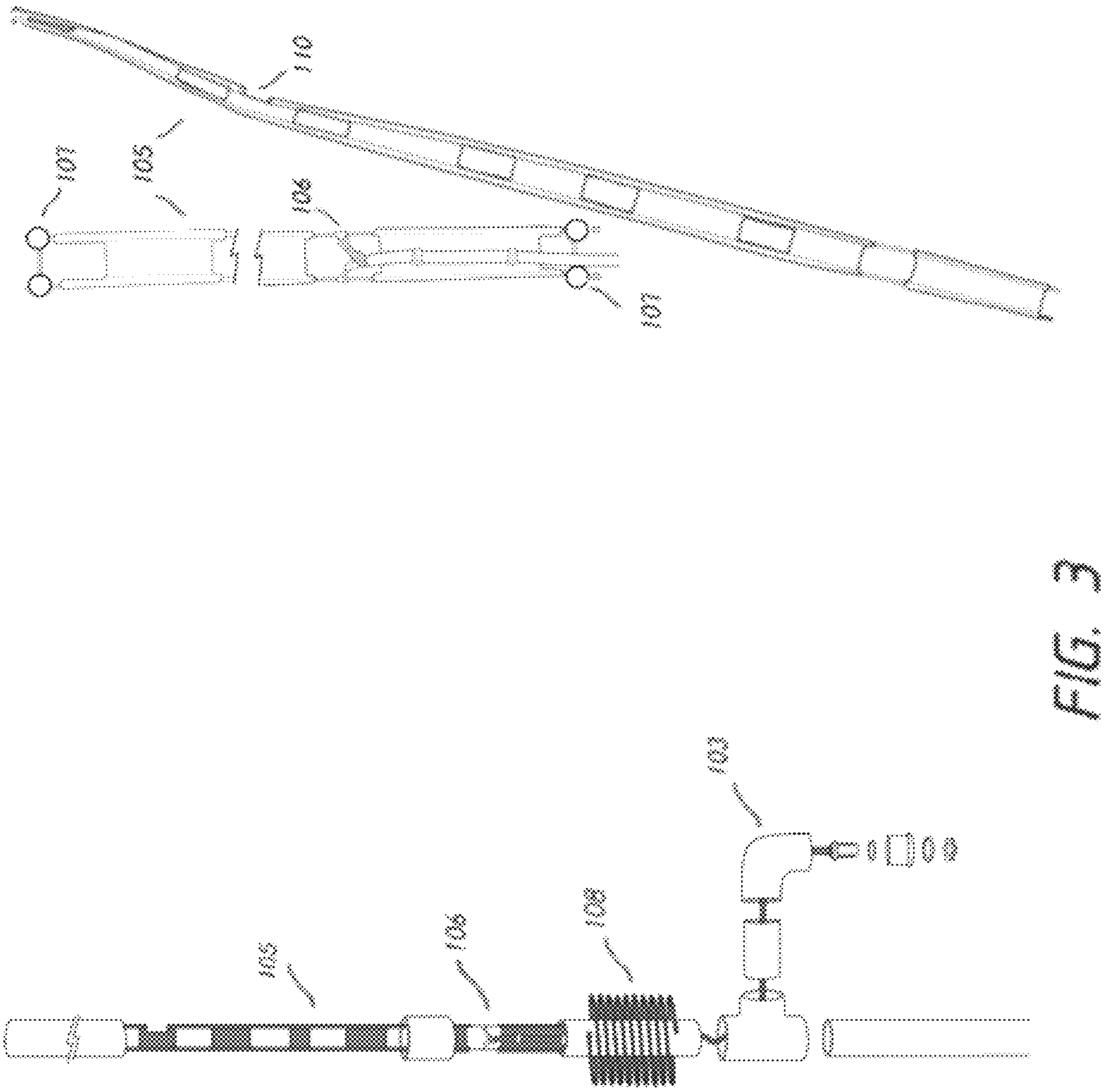
FIG. 3. An alternative drawing of the antenna.

Turning to FIG. 2, the terminal assembly is comprised of two main components. The first component is the elbow end-fitting (202) and the other component is the pass-through connector (201). The connector (201) has two conducting wire paths (206) that pass through the connector in order that the antenna circuit on the interior of the housing is electrically accessible from outside the housing, but with a water-tight barrier. The wire leads from the antenna loop (106) are attached inside the elbow to the pass-through connector leads (206). The end-fitting is comprised of a hole (205) through which the connector is fitted, and then a nut (203) screws onto the connector (201) in order to fasten the connector to the end-fitting. In the preferred embodiment, the hole (205) is shaped so that it has at least one flat side and the connector is shaped so that it also has at least one flat side (206) that substantially matches the flat side of the hole (205). This arrangement fixes the connector in place, provides for a waterproof connector joint, and prevents the connector from spinning around when the exterior connection to the antenna is attached. In the preferred embodiment, the exterior connection is a coaxial connector where a shield of the coaxial cable end connection screws onto the exterior side of the connector, which is one of the leads (206) and the bayonet lead of the coaxial cable is inserted into one of the conductors (206). When the completed terminal assembly (104) is fitted into the elbow (103) and the end caps attached (102), the entire antenna is then housed within a water-tight container. In a preferred embodiment, the housing may be sealed using a suitable cement, such as for improved structural integrity and weatherproofness.

In one embodiment, the housing is painted with a paint that has metallic ingredients or even is a metallic paint. In yet another embodiment, the surface of the paint makes electrical contact with the shield lead of the pass-through connector (206). This provides superior electrical performance between the surface of the housing and the shield of the antenna lead.

In yet another embodiment, the antenna assembly is further comprised of a desiccant that is deposited within the housing during assembly and sealed therein. This substance then absorbs any moisture that may remain within the housing while it is in use. In some cases, a solvent-based colorant may be applied to the housing during or after manufacture. In this embodiment, the colorant does not have any appreciable metallic ingredients and is electrically inert. The desiccant may be a silica compound packaged in a permeable pouch.

The described embodiments of the invention are intended to be exemplary and numerous variations and modifications will be apparent to those skilled in the art. Additional embodiments are described in the attached Appendix, which is incorporated into this Specification for all that it teaches. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendix is intended only to provide an extremely detailed disclosure of one embodiment of the present invention and is not intended to be limiting.

What is claimed:

1. A radio-frequency (RF) common bus assembly providing an RF conduit or bus system for connection at common or ground potential among electronics devices attached to said common bus assembly, comprising:

at least one conductive bus element, said at least one conductive bus element highly conductive at radio frequencies and operable to conduct transient or radio-frequency voltage or current, to which one or a plurality of attachable equipment may be connected;

one or a plurality of conductive connecting elements for attaching said one or plurality of attachable equipment; and one or a plurality of hardware elements for connecting said bus to said one or more connecting elements;

wherein said at least one conductive bus element is machined or manufactured to accept the one or a plurality of conductive connecting elements through attachment using the one or plurality of hardware elements; said at least one conductive bus element having been machined periodically along its length to accept one or a plurality of said attachable equipment by means of a suitably machined tooling comprising one or more relatively flattened attachment points where said one or plurality of hardware elements may be attached.

2. The common bus assembly of claim 1, wherein at least one of said plurality of conductive bus elements is at least partly hollow.

3. The common bus assembly of claim 2, wherein the one or plurality of hardware elements comprises non-corroding hardware.

4. The common bus assembly of claim 3, wherein the non-corroding hardware is selected from the group consisting of stainless steel or brass hardware.

5. The common bus assembly of claim 2, wherein each of said attachable equipment has an equipment chassis, wherein said each equipment chassis of each of said attachable equipment is connected to one of said one or more relatively flattened attachment points on the bus using one of said one or plurality of conductive connecting elements, where each of said one or more conductive connecting elements is a braid assembly comprising a short assembly of conductive braid.

6. The common bus assembly of claim 5, wherein said braid assembly comprises copper braid.

7. The common bus assembly of claim 5, the braid assembly having at least one connecting element termination on each end of said braid assembly, wherein at least one said connecting element termination has a soldered or crimped electrical connector.

8. The common bus assembly of claim 7, wherein the braid assembly has a solder or other electrical junction that is covered with a non-conductive cover.

9. The common bus assembly of claim 7, wherein said soldered or crimped electrical connector is selected from the group consisting of a ring or spade lug connector.

10. The common bus assembly of claim 5, said at least one electrical connector being attached to the braid assembly using an environmentally safer substance.

11. The common bus assembly of claim 10, wherein said environmentally safer substance is selected from the group consisting of silver solder or RoHS solder.

12. The common bus assembly of claim 1, wherein at least one of said one or plurality of conductive connecting elements is at least partly enclosed in a material comprising a non-conductive cover.

13. The common bus assembly of claim 12, wherein the non-conductive cover is clear or translucent.

14. The common bus assembly of claim 13, wherein at least one identifying label or mark is attached to a braid assembly outside the non-conductive cover so as to be visible to the user.

15. The common bus assembly of claim 12, wherein said non-conductive cover is manufactured so as to be applied snugly against one of said one or plurality of conductive connecting elements.

16. The common bus assembly of claim 12, wherein said non-conductive cover comprises heat-shrinkable material.

17. The common bus assembly of claim 12, wherein said non-conductive cover comprises a colored material to identify the corresponding said attachable equipment to which said common bus is attached.

18. The common bus assembly of claim 1, wherein at least one identifying label or mark is attached to a respective one of said one or plurality of conductive connecting elements inside a material comprising a clear or translucent non-conductive cover so as to make said at least one label or mark visible to the user.

19. The common bus assembly of claim 1, wherein said at least one conductive bus element of said common bus assembly is enclosed in a non-conductive case or box.

20. The common bus assembly of claim 19, wherein said non-conductive case or box is hinged.

21. The common bus assembly of claim 19, wherein said non-conductive case or box is made of wood.

22. The common bus assembly of claim 19, wherein said non-conductive case or box is painted, dyed, colored, or stained to resemble typical furniture or cabinetry.

23. The common bus assembly of claim 19, wherein said non-conductive case or box is painted, dyed, colored, or stained to resemble typical electronics equipment.

24. The common bus assembly of claim 19, wherein said non-conductive case or box is attachable or mountable to a common surface selected from the group consisting of desk surfaces, furniture and walls.

25. The common bus assembly of claim 19, wherein said non-conductive case or box has notches located at its base to permit at least one of said one or plurality of conductive connecting elements to pass through the non-conductive case or box and make connection to the bus whether the non-conductive case or box is open or closed.

26. The common bus assembly of claim 1, wherein there are a plurality of said conductive bus elements, wherein each said common bus assembly is electrically connected to at least one of said conductive bus elements.

27. The common bus assembly of claim 26, said plurality of conductive bus elements are electrically connected using a flexible braid.

28. The common bus assembly of claim 26, wherein said plurality of conductive bus elements are electrically connected to each other using a rigid conductor of radio frequencies.

29. The common bus assembly of claim 28, wherein said rigid conductor connecting said plurality of conductive bus elements is comprised of copper pipe.

* * * * *